3,079,338
ANTI-FRICTION MATERIAL
Jacques Jean Caubet, 2 Rue de la Reclusiere,
Saint-Chamond, France
No Drawing. Filed Jan. 26, 1959, Ser. No. 788,741
2 Claims. (Cl. 252—12)

The present invention has for its object a material which is particularly advantageous as an anti-friction material for mechanical applications of the widest variety. It is well known that plastic materials have already been employed as anti-friction materials, in which a solid lubricant such as molybdenum bisulphide or graphite is incorporated with said plastic materials, in order to improve their qualities of resistance to seizure. In compositions of this kind however, the resistance to friction and also the mechanical characteristics of the plastic material are reduced when the temperature exceeds a certain value, and this excludes their use in a large number of applications.

The present invention has for its object a material which overcomes this drawback, and which enables effective lubrication to be obtained even under delicate or difficult conditions, while still retaining stable friction characteristics over a wide range of temperatures.

This compound is essentially constituted by a solid lubricant and a binding agent, with which is associated a lubricant such as stearic acid or butyl stearate, which frees the active molecules when local heating occurs.

The solid lubricant is for example molybdenum bi-sulphide or graphite. The binding agent is selected for its inherent qualities of resistance to mechanical forces or chemical attack: the resins used are preferably ethylene-oxide, a heat-hardenable epoxide resin known as Araldite or polyamide resin having a base of amino-undecanoic acid known as Rilsan.

The combination of the three constituents, solid lubricant, binding agent and auxiliary lubricant freeing the active molecules, has resulted in an unexpected manner, in a material which has a high resistance to compression or to shocks and having a coefficient of friction of the order of 0.005. This material resists the attack of the most corrosive chemicals without substantial effect.

A metallic powder may be added to the anti-friction material thus composed. This addition has the effect of reducing the contraction of the material in the course of its preparation. It also reduces the coefficient of expansion. These two properties are an appreciable advantage in the design of certain mechanical parts.

The metallic powder employed may be of the same metal as the parts to be lubricated. It may also be of any other metal or alloy, according to the expansion characteristics to be obtained. In particular, use may be made of powdered metals of the kind normally employed in the industrial production of sintered metals.

The material in accordance with the invention is prepared by melting its three constituent elements together under heat, and preferably under vacuum. When a metallic powder is added, the latter is preferably incorporated in the resin. The material may be used for the manufacture of moulded friction parts. It can also be employed in the form of a coating which is directly applied to the friction surfaces by projection, extrusion or any other means.

In particular, the material can be conveniently applied in practice by means of a so-called "metallisation gun" or spraying pistol of current construction; by projecting the mixture of the powders according to the invention with the spraying pistol, the coatings thus obtained on metals make it possible to obtain good coefficients of friction in water and when the coatings have a thickness of 0.5 mm. and upwards, they provide good protection against corrosion.

The invention is illustrated by the examples given below.

Example 1

Material containing by weight:
100 parts of Araldite B;
150 parts of molybdenum bisulphide;
0.5 part of stearic acid;
30 parts of hardening agent 901 (Saint-Gobain) which is phthalic acid anhydride.

The Araldite B, molybdenum bisulphide and stearic acid are first melted together in a water-bath at 140°; an intimate mixture is obtained by plungers which are given an axial vibration at high frequency and small amplitude. The hardening agent is then incorporated; the liquified mixture is stirred for the last time for 5 to 10 minutes, under a vacuum of a few centimeters of mercury, and it is then poured into the required moulds and finally polymerised for seven hours at 140° C.; a material is thus obtained which is resistant to a large number of chemical agents and has the following characteristics:

A hardness of about 35 Brinell;
A compression strength of 600 kgs. per sq. cm.;
A coefficient of friction when dry less than 0.005.

According to the qualities required, the proportions may be varied within the following limits (per 100 parts by weight of Araldite B):

Solid lubricant—from 5 to 160 parts;
Lubricant with active molecules—from 0.5 to 5 parts.

Example 2

Material containing by weight:
100 parts of Rilsan (Organico);
250 parts of molybdenum bisulphide;
3.5 parts of stearic acid.

These compounds being melted together at a temperature of 200° C., are made homogeneous by the same vibrator device as that described above.

The product obtained may be poured into moulds by means of any of the usual machines for injection under pressure.

This material has a compression strength greater than 600 kgs. per sq. cm., and a coefficient of friction in the dry state less than 0.005; it is almost completely unaffected by water, and can for example be usefully applied to the manufacture of the joints of hydraulic turbines. A Kaplan turbine joint made from the material according to the invention is superior to the usual carbon joints, having twice the maximum unit stress, only half the rate of wear and very much reduced fragility. Depending on the qualities desired, the proportions may be varied within the following ranges (per 100 parts by weight of Rilsan):

Solid lubricant—from 5 to 300 parts;
Lubricant with active molecules—0.5 to 10 parts.

In addition to the material described above and its method of preparation, the invention also includes in its scope the friction parts made from this material and the mechanical friction parts fitted with a lining of this material.

Example 3

With a material having the following constituents by weight:

|   | Parts |
|---|---|
| Binding agent | 100 |
| Molybdenum bisulphide | 10 |
| Stearic acid | 0.5 | if the binding agent consists exclusively of pure Rilsan, a shrinkage of about 1.8% is observed and the coefficient of expansion 5 times greater than that of steel.

By making up the binding agent with:

| | Parts by weight |
|---|---|
| Rilsan | 30 |
| Iron powder | 70 | there is obtained a material having a shrinkage of 0.5% and a coefficient of expansion which is reduced to less than twice that of steel.

What I claim is:

1. A solid anti-friction material composed of a mixture by weight of 20 to 70% of polyamide synthetic resin, 10 to 40% of molybdenum bisulphide, and 0.5 to 5% of a long-chain fatty acid having at least 15 atoms of carbon.

2. A solid anti-friction material composed of a mixture by weight of 20 to 70% of polyamide synthetic resin, 10 to 40% of molybdenum bisulphide, and 0.5 to 5% of stearic acid.

References Cited in the file of this patent

UNITED STATES PATENTS

| 1,983,184 | Noftzer | Dec. 4, 1934 |
| 2,246,086 | Austin | June 17, 1941 |
| 2,581,301 | Saywell | Jan. 1, 1952 |
| 2,589,582 | Strughold et al. | Mar. 18, 1952 |
| 2,735,813 | Denman | Feb. 21, 1956 |
| 2,849,414 | Stott | Aug. 26, 1958 |
| 2,855,377 | Stott | Oct. 7, 1958 |